(12) United States Patent
Auvray et al.

(10) Patent No.: US 10,961,156 B2
(45) Date of Patent: Mar. 30, 2021

(54) DEVICE COMPRISING A CABLE OR A CABLE ACCESSORY CONTAINING A FIRE-RESISTANT COMPOSITE LAYER

(71) Applicant: NEXANS, Courbevoie (FR)

(72) Inventors: Thierry Auvray, Lyons (FR); Franck Gyppaz, Lyons (FR); Nicolas Estreboou, Oullins (FR)

(73) Assignee: NEXANS, Courbevoie (FR)

( * ) Notice: Subject to any disclaimer, the term of this patent is extended or adjusted under 35 U.S.C. 154(b) by 0 days.

(21) Appl. No.: 16/224,339

(22) Filed: Dec. 18, 2018

(65) Prior Publication Data
US 2019/0202739 A1    Jul. 4, 2019

(30) Foreign Application Priority Data

Dec. 19, 2017 (FR) ...................................... 17 62516

(51) Int. Cl.
*C04B 28/26* (2006.01)
*C04B 24/38* (2006.01)
(Continued)

(52) U.S. Cl.
CPC ............ *C04B 28/26* (2013.01); *C04B 14/022* (2013.01); *C04B 14/024* (2013.01); *C04B 24/02* (2013.01);
(Continued)

(58) Field of Classification Search
CPC ... C04B 28/26; C04B 28/006; C04B 40/0046; C04B 24/383; C04B 24/02;
(Continued)

(56) References Cited

U.S. PATENT DOCUMENTS

2012/0192765 A1* 8/2012 Huynh ................. C04B 28/006
106/632
2014/0026787 A1* 1/2014 Amritphale ........... C04B 24/001
106/697
(Continued)

FOREIGN PATENT DOCUMENTS

GB           454461        10/1936
WO   WO-2005019130 A1 *  3/2005   ........... C04B 22/062
(Continued)

OTHER PUBLICATIONS

[NPL-1] Thierry et al. (WO 2016/051049 A1); Apr. 2016 (EPO machine translation to English). (Year: 2016).*
(Continued)

*Primary Examiner* — David Sample
*Assistant Examiner* — Donald M Flores, Jr.
(74) *Attorney, Agent, or Firm* — Sofer & Haroun, LLP

(57) ABSTRACT

The present invention relates to a device comprising a cable and/or a cable accessory, said cable and/or said cable accessory comprising at least one composite layer obtained from a composite composition based on at least one cellulose derivative, at least one organic compound having a boiling point or a decomposition temperature above about 100° C. and at least one cement composition selected from an aluminosilicate geopolymer composition and a magnesium-based composition, as well as to a method of manufacturing such a device.

18 Claims, 1 Drawing Sheet

(51) Int. Cl.
*C04B 24/02* (2006.01)
*C04B 14/02* (2006.01)
*C04B 40/00* (2006.01)
*H01B 7/295* (2006.01)
*H01B 3/18* (2006.01)
*H01B 13/06* (2006.01)
*H02G 15/02* (2006.01)
*H02G 1/14* (2006.01)
*H02G 15/08* (2006.01)
*H01B 3/14* (2006.01)
*H01B 13/14* (2006.01)
*C04B 28/00* (2006.01)
*C04B 111/00* (2006.01)

(52) U.S. Cl.
CPC .......... *C04B 24/383* (2013.01); *C04B 28/006* (2013.01); *C04B 40/0046* (2013.01); *H01B 3/14* (2013.01); *H01B 3/185* (2013.01); *H01B 7/295* (2013.01); *H01B 13/06* (2013.01); *H01B 13/14* (2013.01); *H02G 1/14* (2013.01); *H02G 15/02* (2013.01); *H02G 15/08* (2013.01); *C04B 2111/00844* (2013.01); *Y10T 428/26* (2015.01)

(58) Field of Classification Search
CPC ........ C04B 14/024; C04B 2111/00844; H01B 13/14; H01B 13/06; H01B 7/295; H01B 3/185; H01B 3/14; H01B 13/22; H02G 15/08; H02G 15/02; H02G 1/14; Y10T 428/26

See application file for complete search history.

(56) References Cited

U.S. PATENT DOCUMENTS

| 2014/0238273 A1* | 8/2014 | Sagoe-Crentsil ..... C04B 28/006 106/624 |
| 2015/0079367 A1* | 3/2015 | Kim ........................ B32B 5/245 428/215 |
| 2017/0345528 A1* | 11/2017 | Gyppaz ............... C04B 16/0633 |
| 2018/0241190 A1* | 8/2018 | Gyppaz ................ H02G 3/0412 |
| 2018/0374608 A1* | 12/2018 | Auvray ................. C04B 28/006 |

FOREIGN PATENT DOCUMENTS

WO   WO-2016051049 A1 * 4/2016   .......... H02G 3/0412
WO   2017098114        6/2017

OTHER PUBLICATIONS

[NPL-2] "Glycerine—Boiling and Freezing Points"; The Engineering Tool Box; Apr. 3, 2016, <http://www.engineeringtoolbox.com/glycerine-boiling-freezing-points-d_1590.html>. (Year: 2016).*
International Search Report dated Aug. 20, 2018.

* cited by examiner

DEVICE COMPRISING A CABLE OR A CABLE ACCESSORY CONTAINING A FIRE-RESISTANT COMPOSITE LAYER

RELATED APPLICATION

This application claims the benefit of priority from French Patent Application No. 17 62516, filed on Dec. 19, 2017, the entirety of which is incorporated by reference.

FIELD OF THE INVENTION

The present invention relates to a device comprising a cable and/or a cable accessory, said cable and/or said cable accessory comprising at least one composite layer obtained from a composite composition based on at least one cellulose derivative, at least one organic compound having a boiling point or a decomposition temperature above about 100° C., and at least one cement composition selected from an aluminosilicate geopolymer composition and a magnesium-based composition, as well as to a method of manufacturing such a device.

It applies typically but not exclusively to electrical and/or optical cables intended for power transmission and/or data transmission, in particular to fire-resistant electrical and/or optical safety cables, notably halogen-free, capable of functioning for a given period of time in the conditions of a fire, but without being a fire propagator or a generator of much smoke; as well as to their accessories such as junctions and/or terminations. These safety cables are in particular cables for medium-voltage power transmission (notably from 6 to 45-60 kV) or low-frequency transmission cables, such as control or signalling cables.

DESCRIPTION OF THE RELATED ART

A power cable and/or telecommunication cable is a cable intended for carrying electrical energy and/or for data transmission. Conventionally it comprises one or more insulated conducting elements, or in other words one or more elongated conductor(s) (electrical and/or optical) surrounded by at least one electrically insulating layer. The electrically insulating layer may typically be an electrically insulating polymer layer optionally in physical contact with the electrical and/or optical conductor or conductors. Said insulated conducting element or elements are surrounded by an outer protective sheath intended as mechanical protection for the insulated conducting element or elements. In certain cable designs there is only a single layer providing the two functions of electrical insulator and protective sheath.

The materials generally used for forming the electrically insulating layer and/or said protective sheath are composite materials based on polymers, for example silicone polymers, and various additives, notably reinforcing fillers such as silica, and fireproofing fillers (or flame retardants) intended to improve their fire resistance.

Despite the presence of these fillers, the fire resistance of these insulating layers is not always entirely satisfactory.

A known way of making one or more fire-resistant cables is to cover said cables with an electrically insulating layer comprising several superposed insulating tapes comprising mica and glass fibres, and a polymer binder (e.g. polyorganosiloxane) in contact with each of said insulating tapes. However, the cost of production of said electrically insulating layer is high (i.e. very long production time) and it is very bulky.

Other materials such as stone, brick, cement, lead, steel, concrete, rock wool, ceramics, geopolymers, etc. have properties of fire resistance.

In particular, geopolymers are essentially mineral chemical compounds or mixtures of compounds consisting of units of the silico-oxide (—Si—O—Si—O—), silico-aluminate (—Si—O—Al—O—), ferro-silico-aluminate (—Fe—O—Si—O—Al—O—), or alumino-phosphate (—Al—O—P—O—) type, created by a process of geopolymerization (i.e. polycondensation). The geopolymers are generally capable of polymerizing and hardening at room temperature (geopolymer cements). It is also possible to accelerate the polymerization rate and therefore the hardening of geopolymers by subjecting them to thermal treatment. The exact mechanism of geopolymerization is still unknown notably on account of the speed of the reaction. The commonest geopolymers are those based on the aluminosilicates denoted by the term "poly(sialate)" [or "poly(silico-oxo-aluminate" or $(-Si-O-Al-O-)_n$ with n denoting the degree of polymerization]. These aluminosilicate geopolymers result from the polycondensation of oligomers of the oligo(sialate) type generally formed from a mixture of at least one source of aluminium, at least one source of silicon, an alkaline reagent and water. The geopolymers based on aluminosilicates have been grouped into three families as a function of the Si/Al atomic ratio, which may be equal to 1, 2 or 3. A distinction is made between the poly(sialates) corresponding to the formula $M_n(-Si-O-Al-O-)_n$ or (M)-PS, the poly(sialate-siloxos) corresponding to the formula $M_n(-Si-O-Al-O-Si-O-)_n$ or (M)-PPS, and the poly(sialate-disiloxos) corresponding to the formula $M_n(-Si-O-Al-O-Si-O-Si-O)_n$ or (M)-PSDS, with M representing at least one alkaline or alkaline-earth cation such as K, Na, Li, Cs or Ca and n denoting the degree of polymerization.

Geopolymers are used in many applications: design of new materials in the fields of civil engineering and construction, creation of sculptures, manufacture of partitions and fire doors for protection against fires, manufacture of coatings for a substrate, mortar, adhesive or moulding material, manufacture of flexible fireproof panels used for fire protection of openings in walls, as well as passages for cables, and quite recently as the structure of the "black box" on board aeroplanes.

In particular, international application WO 2016/051049 A1 describes a fire-resistant layer, used as a junction layer of two fire-resistant cables, comprising at least one cement material such as a geopolymer cement. The layer may further comprise polymer additives such as cellulose acetate or other unspecified cellulose derivatives. However, this solution is not suitable, notably in terms of flexibility and adherence, for serving as a fire-resistant layer in an electric cable and/or data transmission cable and/or in a cable accessory, notably during a fire.

OBJECTS AND SUMMARY

The aim of the present invention is to overcome the drawbacks of the techniques of the prior art by proposing a cable and/or a cable accessory comprising at least one layer having good mechanical properties, notably in terms of flexibility and adherence, while guaranteeing good fire resistance and an advantageous cost price.

Another aim of the invention is to supply a method that is simple, economical, and easy to implement, for making a cable and/or a cable accessory comprising at least one layer that has good mechanical properties, notably in terms of flexibility and adherence, prevents flame propagation, resists fire in order to function for as long as possible, and limits its degradation in extreme thermal conditions such as a fire.

The first object of the present invention is a device comprising a power cable and/or telecommunication cable, and/or an accessory for a power cable and/or telecommunication cable, characterized in that said cable and/or said cable accessory comprises at least one composite layer obtained from a composite composition comprising at least one organic compound having a boiling point or a decomposition temperature above about 100° C., at least one cellulose derivative, and at least one cement composition selected from an aluminosilicate geopolymer composition and a magnesium-based composition comprising a magnesium silicate, an alkaline silicate, an alkaline base and water.

The cement composition is an inorganic composition.

It preferably comprises:
water,
silicon (Si),
aluminium (Al) or magnesium (Mg),
oxygen (O), and
at least one element selected from potassium (K), sodium (Na), lithium (Li), caesium (Cs) and calcium (Ca).

The magnesium-based composition preferably comprises water, silicon (Si), magnesium (Mg), oxygen (O), and at least one element selected from potassium (K), sodium (Na), lithium (Li), caesium (Cs), and calcium (Ca), and preferably selected from potassium (K) and sodium (Na).

The aluminosilicate geopolymer composition preferably comprises water, silicon (Si), aluminium (Al), oxygen (0), and at least one element selected from potassium (K), sodium (Na), lithium (Li), caesium (Cs), and calcium (Ca), and preferably selected from potassium (K) and sodium (Na).

According to an especially preferred embodiment of the invention, the aluminosilicate geopolymer composition comprises an alkaline silicate, an aluminosilicate, water, and optionally an alkaline base.

In the present invention, the cement composition is able to form a cement material.

In particular, the aluminosilicate geopolymer composition is able to form an aluminosilicate geopolymer. The ingredients of the aluminosilicate geopolymer composition may therefore undergo polycondensation to form an aluminosilicate geopolymer. In fact, the geopolymers result from a mineral polycondensation reaction by alkaline activation, called geosynthesis, as opposed to the traditional hydraulic binders in which hardening is the result of hydration of the calcium aluminates and calcium silicates.

The magnesium-based composition is able to form a cement material of a texture similar to that obtained with the aluminosilicate geopolymer composition.

Consequently, the cement composition of the invention is different from a ceramic composition or powder.

The cement composition is in liquid form, which makes it possible to form, with the cellulose derivative and the organic compound having a boiling point or a decomposition temperature above about 100° C., a homogeneous composite composition, notably in the form of a homogeneous composite paste.

The alkaline silicate of the cement composition may be selected from sodium silicates, potassium silicates, and a mixture thereof. The alkaline silicates marketed by the company Silmaco and by the company PQ Corporation are preferred. The alkaline silicate is preferably a sodium silicate.

When it is present, the alkaline base of the cement composition may be selected from KOH, NaOH, and mixtures thereof.

The aluminosilicate of the aluminosilicate geopolymer composition may be selected from the kaolins such as the metakaolins (i.e. calcined kaolins), fly-ash, blast furnace slag, swelling clays such as bentonite, calcined clays, any type of compound comprising aluminium and fumed silica, zeolites, and a mixture thereof.

Among these compounds, the metakaolins are preferred, notably those marketed by the company Imérys.

The magnesium silicate of the magnesium-based composition may be talc.

According to an especially preferred embodiment of the invention, the magnesium-based composition comprises from about 10 to 50 wt % of a magnesium silicate, from about 8 to 35 wt % of an alkaline silicate, from about 5 to 20 wt % of an alkaline base, and from about 10 to 55 wt % of water.

According to an especially preferred embodiment of the invention, the aluminosilicate geopolymer composition comprises from about 10 to 50 wt % of an aluminosilicate, from about 8 to 35 wt % of an alkaline silicate, from about 0 to 10 wt % of an alkaline base, and from about 10 to 55 wt % of water.

In particular, the aluminosilicate geopolymer composition comprises from about 25 to 65 wt % of solid materials (aluminosilicate, alkaline silicate and alkaline base when it is present), and preferably from about 40 to 60 wt %, relative to the total weight of said composition.

The cement composition is in the form of a liquid at room temperature (e.g. 18-25° C.).

The cement composition preferably represents from about 10 to 80 wt %, more preferably from about 30 to 80 wt %, and even more preferably from about 35 to 70 wt %, relative to the total weight of the composite composition.

The cement composition is preferably an aluminosilicate geopolymer composition.

The composite composition further comprises a cellulose derivative.

In the present invention, the expression "cellulose derivative" means a functionalized cellulose, notably functionalized at the level of its hydroxyl functions, and preferably functionalized with one or more organic groups.

The cellulose derivative is preferably a cellulose ester or a cellulose ether. In other words the organic groups are preferably ether or ester groups.

As examples of cellulose esters, we may mention cellulose acetate, cellulose triacetate, cellulose propionate, cellulose acetopropionate or cellulose acetobutyrate.

As examples of cellulose ethers, we may mention methylhydroxyethylcellulose (MHEC), hydroxymethylethylcellulose (HMEC), carboxymethylcellulose (CMC), methylcellulose (MC), ethylcellulose (EC), hydroxyethylcellulose (HEC), hydroxyethylpropylcellulose (HEPC), hydroxypropylmethylcellulose (HPMC) or a salt of one of the aforementioned compounds (such as a salt of an alkali metal, for example such as a sodium salt).

Carboxymethylcellulose (CMC) is preferred.

According to the invention, the cellulose derivative preferably represents from about 1 to 25 wt %, more preferably from about 3 to 20 wt %, and even more preferably from about 5 to 15 wt %, relative to the total weight of the composite composition.

The organic compound having a boiling point or a decomposition temperature above 100° C. makes it possible in particular to promote dissolution of the cellulose derivative in the composite composition.

The organic compound preferably has a boiling point or a decomposition temperature greater than or equal to 140° C., and more preferably greater than or equal to 160° C.

Said organic compound is preferably water-miscible. Thus, this makes it possible to form a homogeneous composite composition in the presence of the cement composition.

Said organic compound is preferably selected from the polyols, notably those comprising from 2 to 12 carbon atoms.

Among the polyols, we may mention xylitol, sorbitol, mannitol, maltitol, lactitol, isomalt, glycerol, dulcitol, iditol, ethylene glycol or propylene glycol.

According to the invention, the organic compound preferably represents from about 10 to 70 wt %, more preferably from about 15 to 50 wt %, and even more preferably from about 20 to 40 wt %, relative to the total weight of the composite composition.

The organic compound may be solid or liquid at room temperature (e.g. 18-25° C.), and preferably liquid at room temperature.

The composite composition may further comprise an expanded carbon-containing material, such as expanded graphite.

The expanded carbon-containing material may represent from about 1 to 20 wt %, and preferably from about 5 to 20 wt %, relative to the total weight of the composite composition.

Owing to the expanded carbon-containing material, the fire protection properties of the composite layer may advantageously be improved.

The composite composition may further comprise one or more additives, notably selected from starch, a plasticizer, an inert filler, a dye, an organic additive with a polymer structure, a crosslinking agent and a mixture thereof.

Such an additive, when present, preferably represents from about 0.1 to 10 wt %, and more preferably from about 2 to 5 wt %, relative to the total weight of the composite composition.

The starch generally comprises amylose, amylopectin, and optionally phytoglycogen.

As an example (depending on the source), the starch comprises from 15 to 30 wt % of amylose, from about 70 to 85 wt % of amylopectin, and from 0 to 20 wt % of phytoglycogen, relative to the total weight of the starch.

The starch may be a native starch or a modified starch, and preferably a native starch.

The native starch may be a starch from cereals (e.g. wheat, maize, barley, triticale, sorghum or rice), from tubers (e.g. potato or cassava), from legumes (e.g. pea or soya), from roots, bulbs, stems, fruits or a mixture thereof.

The modified starch may be a physically, chemically or enzymatically modified starch.

The modified starch may be selected from oxidized starches, starches modified by acid, oxidizing or enzymatic hydrolysis, and starches modified (e.g. functionalized) by physicochemical means, such as notably esterified and/or etherified starches.

Functionalization may be produced by aqueous phase acetylation with acetic anhydride, reactive extrusion of acid anhydrides, of mixed anhydrides, of fatty acid chlorides, of oligomers of caprolactones or of lactides, by glue phase hydroxypropylation, by dry phase or glue phase cationization, by crosslinking, by anionization, by phosphatization or by succinylation, by silylation, by telomerization with butadiene, etc.

Oxidized starches are preferred.

The plasticizer may be intended to improve dispersion of the starch in the composite layer (starch plasticizer) or may be used as a processing aid.

The plasticizer may be a metal stearate, an ethylene glycol, a polyol such as glycerol, sorbitol, mannitol, maltitol, xylitol, a sucrose such as glucose or fructose, a plasticizer containing amide groups, any type of plasticizer based on modified polysaccharide(s) or a mixture thereof.

The preferred plasticizer is a metal stearate such as zinc stearate.

The inert filler may be selected from talc, phyllosilicates, hydrated hydroxides such as aluminium hydroxide (ATH) or magnesium hydroxide (MDH), silicas, borates, micas, and kaolins.

Talc is preferred.

The dye is preferably a dye that is liquid at room temperature (i.e. at 18-25° C.).

The organic additive with a polymer structure is preferably selected from polyolefin fibres such as polypropylene fibres, high-density polyethylenes (HDPE), aramids, and industrial glass fibres coated with silicone or an organic polymer of the polyethylene type, and a mixture thereof.

The crosslinking agent may be a crosslinking agent of the cellulose derivative.

The composite layer is preferably fire-resistant.

With the combination of a cellulose derivative and a cement material obtained from the cement composition, a pliable and/or flexible composite layer may be formed and the latter retains its elasticity over time. This layer therefore has good properties of flexibility and adherence, while guaranteeing good fire resistance. The cellulose derivative guarantees elasticity of the composite layer and its adherence on the layer of the cable with which it is intended to be in direct physical contact; and the cement material, for its part, ensures fire resistance of the composite layer.

In other words, the composite layer of the device of the invention is a homogeneous organic/inorganic hybrid layer. In particular, this homogeneity is obtained by combining a cement material (in particular an aluminosilicate geopolymer) and a cellulose derivative within the composite layer.

The composite layer of the invention comprises a cellulose derivative, an organic compound having a boiling point or a decomposition temperature above 100° C., and a cement material selected from an aluminosilicate geopolymer and a magnesium-based material, the aforementioned compounds being as defined in the invention.

The composite layer of the invention preferably comprises from about 10 to 60 wt % of cement material, and even more preferably from about 20 to 50 wt % of cement material, relative to the total weight of the composite layer.

The composite layer of the invention preferably comprises from about 3 to 20 wt % of cellulose derivative, and even more preferably from about 5 to 15 wt % of cellulose derivative, relative to the total weight of the composite layer.

The composite layer may further comprise from 0.01 to 30% of water and/or from 0.01 to 15% of organic compound, notably resulting from the method for preparing said layer as described hereunder. The water and the organic compound optionally serving for dissolving or dispersing the cellulose derivative and the constituents of the cement composition for preparing the composite composition, might not be removed completely at the end of the process. The water and/or the organic compound are then for example in the form of molecules forming non-covalent bonds (e.g. van der Waals bonds) with the other compounds of the layer.

The cement material is preferably an aluminosilicate geopolymer.

Advantageously, the device according to the invention meets at least any one of the following fire resistance standards: EN50200, IEC60331-1, EN50399, IEC60331-11, IEC60331-21, IEC60331-23, IEC60331-25, DIN4102, NBN713020 addendum 3, EN50577, NFC32070 CR1, IEC600332-1 and BS6387CWZ, and preferably at least either one of the standards IEC60331-11 and IEC60331-21.

Advantageously, the composite layer defined above meets the fire resistance standard IEC 60331-11, with electric cables at a voltage of 10 kV exposed to a temperature of about 750° C. for 120 minutes.

The composite layer of the invention may be an extruded layer and/or a taped layer (i.e. in the form of a ribbon or tape), or a layer in the form of a filling.

When the composite layer is an extruded and/or taped layer, it preferably has an approximately constant thickness and notably constitutes a continuous protective envelope.

The composite layer preferably has a thickness ranging from about 2 to 6 mm, and more preferably ranging from about 3 to 5 mm.

When the thickness of the composite layer is less than 1.5 mm, there is insufficient thermal protection of the device of the invention.

The composite layer preferably comprises an aluminosilicate geopolymer having a Si/Al molar ratio ranging from 1 to 35, and preferably from 1.9 to 3.

The aluminosilicate geopolymer of the composite layer may be selected from the poly(sialates) corresponding to formula (I) $M_n(-Si-O-Al-O-)_n$ [(M)-PS], the poly(sialate-siloxos) corresponding to formula (II) $M_n(-Si-O-Al-O-Si-O-)_n$ [(M)-PPS], and the poly(sialate-disiloxos) corresponding to formula (III) $M_n(-Si-O-Al-O-Si-O-Si-O)_n$ [(M)-PSDS]; in these formulae M represents at least one alkaline cation K, Na, Li, Cs or a mixture thereof, and n denotes the degree of polymerization. In the compound of formula (I) the Si/Al molar ratio is 1, in the compound of formula (II) the Si/Al molar ratio is 2, and in the compound of formula (III) the Si/Al molar ratio is 3.

The composite layer of the invention is preferably non-porous.

The composite layer of the invention is preferably an electrically insulating layer.

In the present invention, "electrically insulating layer" means a layer whose electrical conductivity may be at most $1.10^{-9}$ S/m, and preferably at most $1.10^{-10}$ S/m (siemens per metre) (at about 25° C.).

Owing to the presence of the composite layer, the device according to the invention has good mechanical properties while having excellent fire resistance. In particular, the composite layer is sufficiently flexible to allow manipulation of the cable (e.g. winding, folding, twisting) but without causing any prohibitive alteration of said layer that would lead to a decrease in its cohesion and fire resistance. Moreover, the composite layer remains intact from the room temperature to the operating temperature of the cable under load (i.e. under voltage) and offers the advantage of forming an ordered porous structure starting from 450° C., thus providing reinforced protection against the propagation of heat for temperatures greater than or equal to 1000° C. for a time of up to 120 min, notably reached during a fire. This rigid porous structure contains air, which by its nature is an excellent thermal insulator.

In other words, the composite layer is transformed under the effect of high temperature, notably a temperature from 450° C. to 1000° C., generally reached during a fire, to form a porous, cohesive residual layer that protects the cable or cable accessory, and notably the underlying layers and/or the elongated conducting element.

Finally, the composite layer of the invention has good elasticity or flexibility, allowing it to be used in the form of ribbon or tape.

According to a first variant of the invention, the device comprises a power cable and/or a telecommunication cable.

A power cable and/or a telecommunication cable generally comprises at least one elongated conducting element and at least one outer protective sheath, notably electrically insulating.

According to a second variant of the invention, the device comprises an accessory for a power cable and/or telecommunication cable.

A cable accessory may be a junction or a termination that may comprise an assembly of several layers of materials (e.g. of polymer materials) generally of the silicone rubber type, optionally one or more reinforcing layers, for example one or more metallic layers, as well as an outer protective sheath (e.g. fireproof) such as for example an elastomer ribbon or a mica tape or an assembly of one or more layers of ethylene-propylene-diene monomer (EPDM), optionally one or more metallic layers, and at least one expanded layer of EPDM, notably in the form of a shape-memory tube.

The composite layer is preferably an inner layer of said cable or of said cable accessory.

According to the invention, "inner layer" means a layer that is not the outermost layer of the cable or cable accessory, and more particularly:
  in the case of a cable, a layer interposed between the elongated conducting element and an outer protective sheath, notably electrically insulating, said layer being or not being in direct contact with the elongated conducting element and
  in the case of a junction or a termination, a layer interposed between the outer protective sheath and one of the layers of material of the silicone rubber type and/or one of the reinforcing layers, said layer being or not being in direct contact with said outer sheath.

The composite layer of the cable of the invention generally covers one or more elongated conducting elements or is positioned on a sheath or inner layer of the cable or cable accessory, and then performs the function of filling.

According to a preferred embodiment, the device is a cable.

In this case, the cable comprises at least one elongated conducting element and the composite layer as defined in the invention surrounds said elongated conducting element.

The cable may comprise a plurality of elongated conducting elements. The composite layer may then surround the plurality of elongated conducting elements of the cable.

The cable may comprise a plurality of composite layers as defined in the invention, preferably two composite layers, and especially preferably two internal composite layers.

According to a first variant of this embodiment, the cable comprises one or more elongated conducting elements and the plurality of composite layers surrounds the elongated conducting element or the plurality of elongated conducting elements.

As an example, the cable may comprise two adjacent composite layers as defined in the invention.

According to a second variant of this embodiment, the cable comprises a plurality of elongated conducting elements and each of the composite layers surrounds each of the elongated conducting elements individually to form insulated elongated conducting elements.

The elongated conducting element or elements of the cable of the invention are preferably elongated electrically conducting elements. The cable is consequently an electric cable.

The cable of the invention may further comprise an outer protective sheath, notably electrically insulating, surrounding the composite layer or layers.

The outer protective sheath is preferably made of a halogen-free material. It may be made conventionally starting from materials that retard flame propagation or are resistant to flame propagation. Notably, if the latter do not contain halogen, we use the term HFFR (Halogen-Free Flame Retardant) cladding.

The outer protective sheath represents the outermost layer of the cable. It ensures the mechanical integrity of the cable.

It comprises at least one organic or inorganic polymer.

The choice of the organic or inorganic polymer is not limiting and the latter are familiar to a person skilled in the art.

According to a preferred embodiment of the invention, the organic or inorganic polymer is selected from cross-linked and non-crosslinked polymers.

The organic or inorganic polymer may be a homopolymer or a copolymer having thermoplastic and/or elastomeric properties.

The inorganic polymers may be polyorganosiloxanes.

The organic polymers may be polyurethanes or polyolefins.

The polyolefins may be selected from the polymers of ethylene and of propylene. As examples of ethylene polymers, we may mention linear low-density polyethylene (LLDPE), low-density polyethylene (LDPE), medium-density polyethylene (MDPE), high-density polyethylene (HDPE), copolymers of ethylene and vinyl acetate (EVA), copolymers of ethylene and butyl acrylate (EBA), of methyl acrylate (EMA), of 2-hexylethylacrylate (2HEA), copolymers of ethylene and alpha-olefins such as for example polyethylene-octene (PEO), copolymers of ethylene and propylene (EPR), terpolymers of ethylene and propylene (EPT) such as for example the terpolymers of ethylene propylene diene monomer (EPDM) or a mixture thereof.

The polymer of the sheath is preferably an organic polymer, more preferably an ethylene polymer, and more preferably a copolymer of ethylene and vinyl acetate, a linear low-density polyethylene or a mixture thereof.

The outer protective sheath may further comprise a hydrated mineral fireproofing filler. This hydrated mineral fireproofing filler acts mainly physically by decomposing endothermically (e.g. release of water), which has the result of lowering the temperature of the sheath and limiting flame propagation along the cable. Such properties are notably known as flame retardant properties.

The hydrated mineral fireproofing filler may be a metal hydroxide such as magnesium hydroxide or aluminium trihydroxide.

The outer protective sheath may further comprise an inert filler, notably selected from talc, micas, dehydrated clays and a mixture thereof.

The second object of the invention is a method of manufacturing a device comprising a power cable and/or telecommunication cable and/or an accessory for a power cable and/or telecommunication cable as defined according to the first object of the invention, characterized in that it comprises at least the following steps:

1) preparing a composite composition as defined in the invention according to at least the following steps:
  i) preparing a cement composition selected from an aluminosilicate geopolymer composition comprising an aluminosilicate, an alkaline silicate, water, and optionally an alkaline base, and a magnesium-based composition comprising a magnesium silicate, an alkaline silicate, water, and an alkaline base,
  ii) mixing the cement composition from step i) with a cellulose derivative, an organic compound having a boiling point or a decomposition temperature above about 100° C., and optionally water; and
2) forming a composite layer as defined in the invention starting from the composite composition obtained in step 1):
  either around one or more elongated conducting elements and/or around a layer of a power cable and/or a telecommunication cable, when the device is a cable,
  or around at least one of the layers of a junction or of a termination, when the device is a cable accessory.

The aluminosilicate, magnesium silicate, alkaline silicate, alkaline base, the cellulose derivative and the organic compound having a boiling point or a decomposition temperature above about 100° C. are as defined in the first object of the invention.

The method according to the invention is quick, simple and advantageous from an economic standpoint. It allows a device having excellent fire resistance to be manufactured in a few steps, while guaranteeing good mechanical properties, notably in terms of flexibility.

An inert filler and/or a dye and/or a starch and/or a starch plasticizer and/or an organic additive with a polymer structure and/or a crosslinking agent as defined in the first object of the invention may be added during step ii) or after step ii).

The expanded carbon-containing material as defined in the first object of the invention may be added during step ii). Thus, step ii) carries out mixing of the cement composition from step i) with a cellulose derivative, an organic compound having a boiling point or a decomposition temperature above about 100° C., optionally water; and the expanded carbon-containing material. This may advantageously ensure perfect dispersion and homogeneity of the composite composition.

Step ii) (mixing step) may take at least 10 min.

Preparation of the aluminosilicate geopolymer composition according to step i) is generally carried out at a high pH, notably ranging from 10 to 13.

Step i) preferably comprises the following substeps:
  i-a) preparing an aqueous solution of alkaline silicate with a molar ratio $SiO_2/M'_2O$ from about 1.6 to 35, and preferably from about 1.6 to 4, M' being an alkali metal, the concentration by weight of the alkaline silicate in water ranging from about 30 to 60%, and preferably from about 40 to 60%, and
  i-b) mixing an aluminosilicate in the form of powder with a molar ratio $Al_2O_3/SiO_2$ from about 0.4 to 0.8 with the aqueous solution of alkaline silicate prepared in the preceding step, the concentration by weight of the aluminosilicate in the aqueous solution of alkaline silicate prepared in the preceding substep ranging from about 10 to 80%, and preferably from about 25% to 65%.

A liquid aluminosilicate geopolymer composition is formed by combining the aqueous solution of alkaline silicate and the solution of aluminosilicate.

The aqueous solution of alkaline silicate in substep i-a) may be prepared by mixing silicon dioxide $SiO_2$ or an alkaline silicate with a base M'OH in which M' is preferably K, Na or a mixture thereof.

The silicon dioxide $SiO_2$ may be selected from silicas such as fumed silica (also known as "pyrogenic silica"), quartz, and mixtures thereof.

In particular, the alkaline base M'OH may be dissolved in water, leading to release of heat (exothermic reaction), then the silicon dioxide $SiO_2$ or the alkaline silicate may be added.

The alkaline silicate may be selected from sodium silicates, potassium silicates, and a mixture thereof. The alkaline silicates marketed by the company Silmaco and by the company PQ Corporation are preferred. The alkaline silicate is preferably a sodium silicate.

The aluminosilicate may be selected from the kaolins such as metakaolins (i.e. calcined kaolins), fly-ash, blast furnace slag, swelling clays such as bentonite, calcined clays, any type of compound comprising aluminium and fumed silica, zeolites, and a mixture thereof.

Among these compounds, the metakaolins are preferred, notably those marketed by the company Imérys.

The magnesium silicate is preferably talc.

In step ii), water may be particularly useful for dissolving the organic compound when the latter is a solid or a viscous liquid.

At the end of step ii), a homogeneous paste is obtained, which may then be used in the next step 2).

Step ii) may be carried out by separately preparing a solution comprising the cellulose derivative, the organic compound and optionally water, then mixing this solution with the cement composition from step i).

The expanded carbon-containing material may advantageously be added after mixing the solution comprising the cellulose derivative, the organic compound and optionally water, with the cement composition from step i). This may advantageously ensure perfect dispersion and homogeneity of the composite composition.

The geopolymer is formed during steps i) and ii).

When the device is a cable, step 2) may be carried out:
- by extruding said composite composition around one or more elongated conducting elements and/or around a layer of a power cable and/or telecommunication cable, or
- by forming a ribbon or tape starting from said composite composition, then winding said ribbon or tape around one or more elongated conducting elements and/or around a layer of a power cable and/or telecommunication cable.

When the device is an accessory, step 2) may be carried out by forming a ribbon or a tape starting from said composite composition, then winding said ribbon or tape around at least one of the layers of a junction or of a termination.

Extrusion may be carried out at room temperature or hot, notably at a temperature from about 60° C. to 110° C., and preferably from about 70° C. to 95° C.

The ribbon or tape may be obtained by extrusion, notably at a temperature from about 20 to 90° C. or by calendering at room temperature (e.g.
20-25° C.).

Winding may moreover be carried out with areas of overlap.

According to a particular embodiment of the invention, and when the device is a power cable and/or a transmission cable, the method may further comprise before, during or after step 2), a step 3) of application of an outer protective sheath as defined in the first object of the invention, notably electrically insulating, around the composite layer.

This outer protective sheath may notably be produced by extrusion or co-extrusion.

Step 3) is generally carried out at room temperature, since geopolymerization takes place at ambient temperature.

A third object of the invention is a composite composition, notably for a device comprising a power cable and/or a telecommunication cable, and/or an accessory for a power cable and/or a telecommunication cable, said composite composition comprising at least one organic compound having a boiling point or a decomposition temperature above about 100° C., at least one cellulose derivative, and at least one cement composition selected from an aluminosilicate geopolymer composition and a magnesium-based composition comprising a magnesium silicate, an alkaline silicate, an alkaline base and water.

The composite composition may be as defined in the first and second objects of the invention.

The organic compound having a boiling point or a decomposition temperature above 100° C., the cellulose derivative, the cement composition, the aluminosilicate geopolymer composition, and the magnesium-based composition may be as defined in the first and second objects of the invention.

Preferably, the composite composition of the invention may be used for forming a composite layer that is extruded and/or taped (i.e. in the form of a ribbon or tape), or a layer in the form of a filling, these layers being as described in the invention.

BRIEF DESCRIPTION OF THE DRAWINGS

The invention will be better understood, and other aims, details, features and advantages of the invention will become clearer from the following description of particular embodiments of the invention, given solely for purposes of illustration and non-limiting, referring to the appended figures.

In these figures.

DETAILED DESCRIPTION

For reasons of clarity, only the elements that are essential for understanding the invention are shown schematically in these figures, which are not to scale.

Figure 1:
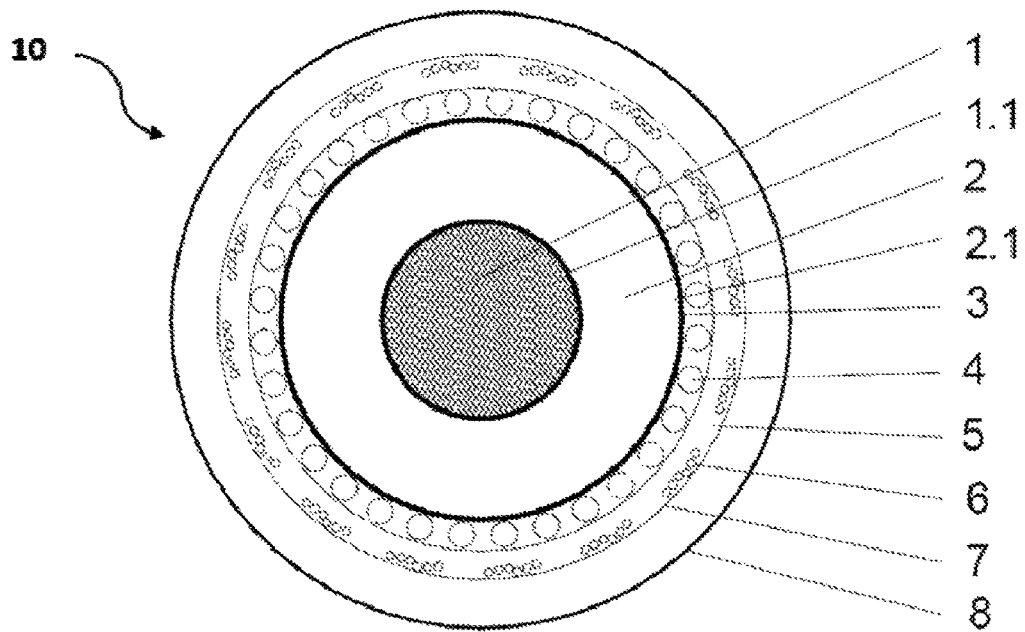
FIG. 1 is a schematic view of a cross-section of an electric cable of the prior art not according to the invention.

The electric cable 10, illustrated in FIG. 1, corresponds to a fire-resistant medium-voltage electric cable of type SHXCHX for marine applications.

This electric cable 10 comprises: an elongated central electrically conducting element 1 and, successively and coaxially around this central conducting element 1, an inner semi-conducting screen 1.1, an electrically insulating layer 2 (e.g. of crosslinked ethylene-propylene elastomer, EPR), an outer semi-conducting screen 2.1, a semi-conducting taped layer 3, metal braiding 4 (e.g. consisting of tinned copper wires of circular cross-section), an inner sheath comprising a polyester tape 5 and tinned copper wires 6, a polyester tape 7, and an outer sheath 8 (e.g. of elastomer).

Figure 2:
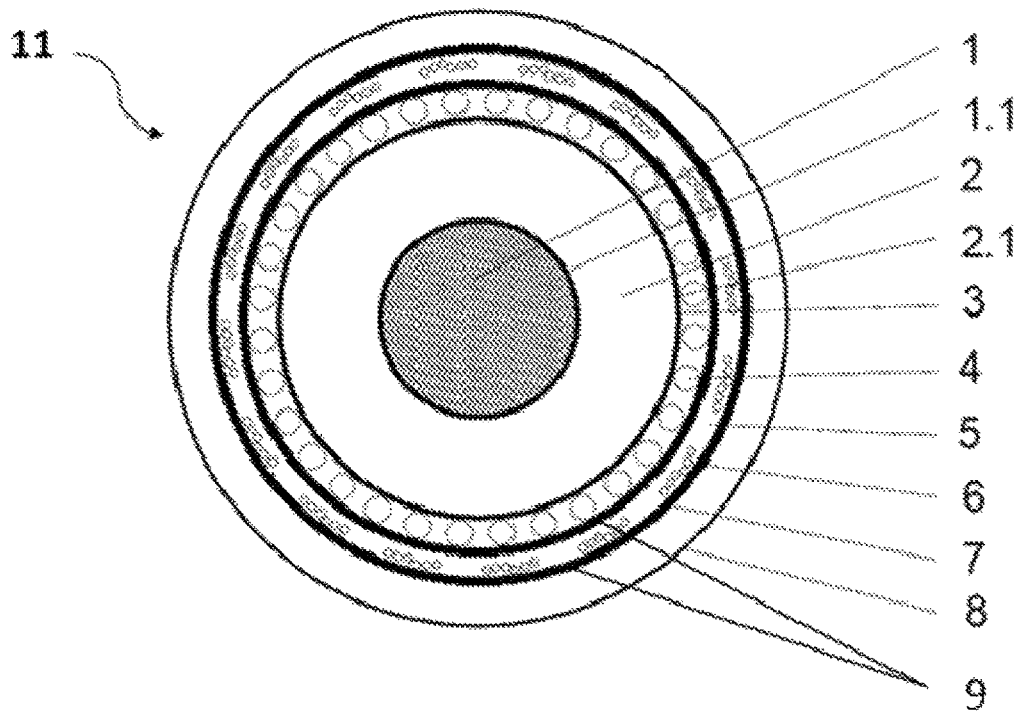
FIG. 2 is a schematic view of a cross-section of an electric cable according to an embodiment of the present invention.

The electric cable 11, illustrated in FIG. 2, corresponds to an electric cable with a structure similar to that of the cable in FIG. 1 but in which two composite layers as defined in the invention have been incorporated.

This electric cable 11 comprises: an elongated central electrically conducting element 1 and, successively and coaxially around this central conducting element 1, an inner semi-conducting screen 1.1, an electrically insulating layer 2 (e.g. of crosslinked ethylene-propylene elastomer, EPR), an outer semi-conducting screen 2.1, a semi-conducting taped layer 3, metal braiding 4 (e.g. consisting of tinned copper wires of circular cross-section), a first composite layer 9 as defined in the invention, an inner sheath comprising a polyester tape 5 and tinned copper wires 6, a polyester tape 7, a second composite layer 9 as defined in the invention, and an outer sheath 8 (e.g. of elastomer).

The present invention is illustrated in the following examples. They do not limit the overall scope of the invention as presented in the claims. The ratios of the oxides are molar ratios and the percentages stated are percentages by weight.

EXAMPLES

The raw materials used in the examples are listed below:
aqueous solution of sodium silicate at about 50 wt % of the "waterglass" type, Simalco, of formula $Na_2O.2SiO_2$ and with $SiO_2/Na_2O$ molar ratio of about 2,
aluminosilicate Aluminosilicate, PoleStar® 200R, Imérys, with $Al_2O_3/SiO_2$ molar ratio of 41/55 (i.e. about 0.745),
tap water,
sodium hydroxide, Sigma Aldrich, of purity>85%,
carboxymethylcellulose, Aqualon™, Ashland,
glycerol, 8400, Roquette,
expanded graphite, from the company LUH, GHL PX 98 HE.

Unless stated otherwise, all these raw materials were used as received from the manufacturers.

Example 1: Preparation of a Fire-Resistant Device According to the Invention A solution of alkaline silicate was prepared by mixing 252 g of aqueous solution of sodium silicate, 276 g of water and 54 g of sodium hydroxide. Then 288 g of aluminosilicate was mixed with the solution of alkaline silicate to form an aluminosilicate geopolymer composition.

Said aluminosilicate geopolymer composition therefore comprised:
14.5 wt % of sodium silicate,
6.2 wt % of sodium hydroxide,
33.1 wt % of aluminosilicate, and
46.2 wt % of water.

The aluminosilicate geopolymer composition comprised about 53.8 wt % of solid materials relative to the total weight of said composition.

Separately, a solution of cellulose derivative was prepared by mixing 83.5 g of carboxymethylcellulose (CMC) and 438.5 g of glycerol.

The solution of cellulose derivative was added to the aluminosilicate geopolymer composition in order to form a composite composition.

The composite composition comprised 6.0 wt % of CMC, 31.5 wt % of glycerol, 20.7 wt % of aluminosilicate, 3.9 wt % of potassium hydroxide, 9.0 wt % of sodium silicate and 28.9 wt % of water.

The composite composition was extruded in the form of a tape using a MAPRE extruder.

The tape had a thickness of about 3.5 mm.

Example 2: Preparation of a Fire-Resistant Device According to the Invention A solution of alkaline silicate was prepared by mixing 95 g of aqueous solution of sodium silicate, 103 g of water and 21 g of sodium hydroxide. Then 108 g of aluminosilicate was mixed with the solution of alkaline silicate to form an aluminosilicate geopolymer composition.

Said aluminosilicate geopolymer composition therefore comprised:
14.5 wt % of sodium silicate,
6.5 wt % of sodium hydroxide,
33.0 wt % of aluminosilicate, and
46.0 wt % of water.

The aluminosilicate geopolymer composition comprised about 54 wt % of solid materials, relative to the total weight of said composition.

Separately, a solution of cellulose derivative was prepared by mixing 282 g of carboxymethylcellulose (CMC), and 1480 g of glycerol.

The solution of cellulose derivative was added to the aluminosilicate geopolymer composition in order to form a composite composition. Then 208 g of expanded graphite is added to the composite composition, and the resultant mixture is mixed for 10 min.

The composite composition comprised 12.3 wt % of CMC, 64.4 wt % of glycerol, 4.7 wt % of aluminosilicate, 0.9 wt % of sodium hydroxide, 2.1 wt % of sodium silicate, 9.0 wt % of expanded graphite, and 6.6 wt % of water.

The composite composition was extruded hot around an elongated electrically conducting element made of copper with a section of 50 $mm^2$ using an extruder sold under the trade name ANDOUARD. The temperature inside the extruder ranged from about 40° C. to 95° C., from the hopper 40° C. to 95° C. at die outlet.

The layer thickness was about 3.5 mm.

The cable obtained comprised an elongated electrically conducting element surrounded by an electrically insulating composite layer according to the invention.

The composite layer of the cable according to the invention was evaluated for fire resistance performance according to standards IEC 60331-11 and IEC 60331-21. The cable as obtained in example 2, and for comparison a cable not according to the invention, not comprising the composite layer of the invention (i.e. the elongated electrically conducting element alone), were subjected to a voltage of 10 kV at 750° C.

The results of this test are presented in Table 1 below:

TABLE 1

| Cable | Voltage applied | Time before breakdown (in min) |
|---|---|---|
| Cable according to the invention from example 2 | 10 kV | 45 |
| Cable not according to the invention | 10 kV | 13 |

The results presented in Table 1 confirm the improved fire resistance of the cable of the invention.

The invention claimed is:
1. A device comprising:
a power cable and/or a telecommunication cable, and/or an accessory for a power cable and/or a telecommunication cable,
wherein said cable and/or said cable accessory comprise at least one composite layer obtained from a composite composition comprising at least one organic compound having a boiling point or a decomposition temperature above 100° C., at least one cellulose derivative, and at least one cement composition selected from the group consisting of
an aluminosilicate geopolymer composition, and a magnesium-based composition, said magnesium-based composition comprising a magnesium silicate, an alkaline silicate, water, and an alkaline base, and
wherein the organic compound represents from 10 to 70 wt %, relative to the total weight of the composite composition.

2. The device according to claim 1, wherein the cement composition is selected from the group consisting of:
the aluminosilicate geopolymer composition, and
the magnesium-based composition,
said cement composition comprising water, silicon (Si), aluminium (Al) or magnesium (Mg), oxygen (O), and at least one element selected from potassium (K), sodium (Na), lithium (Li), caesium (Cs), and calcium (Ca).

3. The device according to claim 1, wherein the aluminosilicate geopolymer composition comprises an alkaline silicate, an aluminosilicate, water, and optionally an alkaline base.

4. The device according to claim 1, wherein the aluminosilicate geopolymer composition comprises from 10 to 50 wt % of an aluminosilicate, from 8 to 35 wt % of an alkaline silicate, from 0 to 10 wt % of an alkaline base and from 10 to 55 wt % of water.

5. The device according to claim 1, wherein the magnesium-based composition comprises from 10 to 50 wt % of the magnesium silicate, from 8 to 35 wt % of the alkaline silicate, from 5 to 20 wt % of the alkaline base and from 10 to 55 wt % of water.

6. The device according to claim 1, wherein the cement composition represents from 10 to 80 wt %, relative to the total weight of the composite composition.

7. The device according to claim 1, wherein the cellulose derivative is a cellulose ether or a cellulose ester.

8. The device according to claim 1, wherein the cellulose derivative represents from 1 to 25 wt %, relative to the total weight of the composite composition.

9. The device according to claim 1, wherein the organic compound is selected from polyols.

10. The device according to claim 1, wherein the composite composition further comprises an expanded carbon-containing material.

11. The device according to claim 1, wherein the composite composition further comprises one or more additives selected from starch, a plasticizer, an inert filler, a dye, an organic additive with a polymer structure, a crosslinking agent and a mixture thereof.

12. The device according to claim 1, wherein the composite layer is in the form of an extruded layer and/or a taped layer, or a layer in the form of a filling.

13. The device according to claim 1, wherein the composite layer has a thickness ranging from 2 to 6 mm.

14. The device according to claim 1, wherein the composite layer is an inner layer of said cable or of said cable accessory.

15. A composite composition for a composite layer of a power cable and/or a telecommunication cable, or an accessory for a power cable and/or a telecommunication, said composite composition comprising:
at least one organic compound having a boiling point or a decomposition temperature above 100° C.,
at least one cellulose derivative, and
at least one cement composition selected from the group consisting of;
an aluminosilicate geopolymer composition and
a magnesium-based composition, said magnesium-based composition comprising a magnesium silicate, an alkaline silicate, water, and an alkaline base, and
wherein the organic compound represents from 10 to 70 wt %, relative to the total weight of the composite composition.

16. A device comprising a power cable and/or a telecommunication cable, and/or an accessory for a power cable and/or a telecommunication cable, wherein said cable and/or said cable accessory comprise at least one composite layer obtained from a composite composition comprising at least one organic compound having a boiling point or a decomposition temperature above 100° C., at least one cellulose derivative, and at least one cement composition selected in the group consisting of:
an aluminosilicate geopolymer composition, and
a magnesium-based composition, said magnesium-based composition comprising a magnesium silicate, an alkaline silicate, water, and an alkaline base, and
wherein the composite composition further comprises an expanded carbon-containing material.

17. A device comprising a power cable and/or a telecommunication cable, and/or an accessory for a power cable and/or a telecommunication cable, wherein said cable and/or said cable accessory comprise at least one composite layer obtained from a composite composition comprising at least one organic compound having a boiling point or a decomposition temperature above 100° C., at least one cellulose derivative, and at least one cement composition,
wherein said cement composition is a magnesium-based composition comprising from 10 to 50 wt % of a magnesium silicate, from 8 to 35 wt % of an alkaline silicate, from 5 to 20 wt % of an alkaline base and from 10 to 55 wt % of water.

18. Method of manufacturing a device as defined in claim 1, wherein said method comprises at least the following steps:
1) preparing a composite composition according to at least the following steps:
i) preparing a cement composition selected from an aluminosilicate geopolymer composition comprising an aluminosilicate, an alkaline silicate, water, and optionally an alkaline base, and a magnesium-based composition comprising a magnesium silicate, an alkaline silicate, water, and an alkaline base,
ii) mixing the cement composition from step i) with a cellulose derivative, an organic compound having a boiling point or a decomposition temperature above about 100° C., and optionally water,
wherein the organic compound represents from 10 to 70 wt %, relative to the total weight of the composite composition; and
2) forming a composite layer starting from the composite composition obtained in step 1):
either around one or more elongated conducting elements and/or around a layer of a power cable and/or telecommunication cable, when the device is a cable,
or around at least one of the layers of a junction or of a termination, when the device is a cable accessory.

* * * * *